United States Patent [19]

Dahl

[11] Patent Number: 4,643,496
[45] Date of Patent: Feb. 17, 1987

[54] STORAGE AND SECURITY SYSTEM FOR CASSETTE-LIKE OBJECTS

[76] Inventor: Ernest A. Dahl, 5419 E. Lake Shore Dr., Wonder Lake, Ill. 60097

[21] Appl. No.: 794,138

[22] Filed: Nov. 1, 1985

[51] Int. Cl.[4] ............................................. A47B 88/18
[52] U.S. Cl. .................................. 312/299; 312/125; 312/305
[58] Field of Search ............... 312/135, 305, 202, 125, 312/252, 115, 111, 285, 290, 299; 211/4, 163, 165; 206/44 R

[56] References Cited

U.S. PATENT DOCUMENTS

| | | | |
|---|---|---|---|
| 241,123 | 5/1881 | Danner | 312/202 X |
| 405,003 | 6/1889 | Blackledge | 312/285 X |
| 3,326,615 | 6/1967 | Karper | 312/285 X |
| 4,179,168 | 12/1979 | Isaac et al. | 312/305 X |
| 4,442,942 | 4/1984 | Cuminale et al. | 211/4 X |

FOREIGN PATENT DOCUMENTS 6381 of 1905 United Kingdom ............. 206/44 R

Primary Examiner—Francis K. Zugel
Assistant Examiner—Joseph Falk
Attorney, Agent, or Firm—Edward L. Benno

[57] ABSTRACT

A cabinet arrangement for the storage and use of cassette-like objects such as microfilm boxes or data tape cartridges with the cabinet in one form intended to be placed upon a table adjacent a person's work station, and in another stacked form intended to be used from a floor position. The cabinet arrangement comprises a plurality of open-faced boxes individually rotatively mounted on a swivel base assembly. The boxes can be aligned in any combination of the open-faced sides facing outwardly for access to the microfilm boxes or inwardly for prevented access to the cassette-like objects. A number of constructions are shown for fixing the boxes against rotation in any such combination.

11 Claims, 10 Drawing Figures

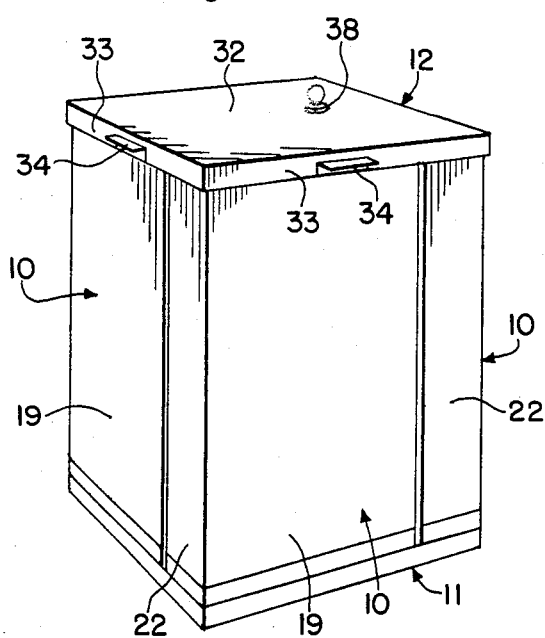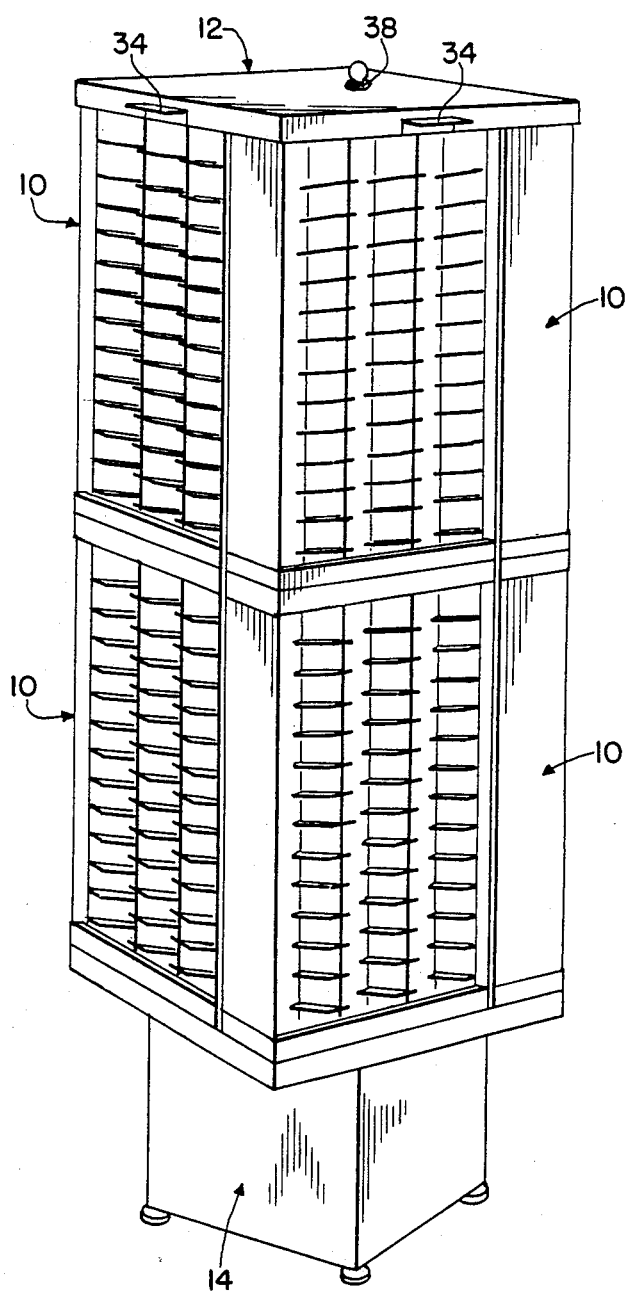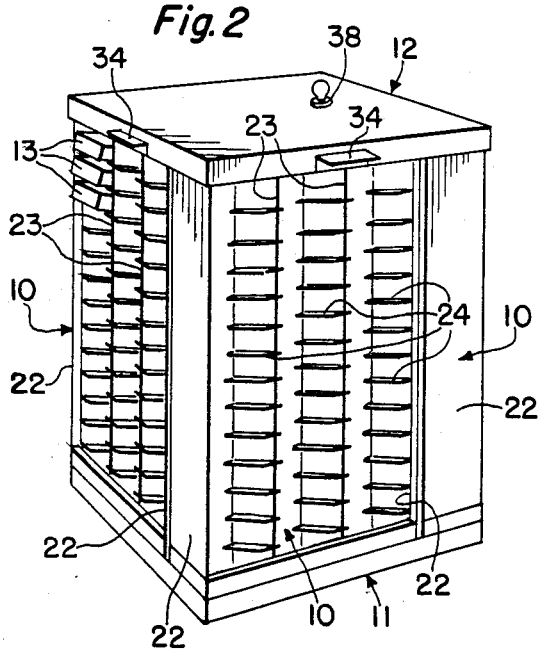

STORAGE AND SECURITY SYSTEM FOR CASSETTE-LIKE OBJECTS

BACKGROUND OF THE INVENTION

The subject invention is concerned with the storage and security of relatively large numbers of cassette-like objects such as boxes or cases containing individual rolls of film known as microfilm. In many present day business operations, business records and documents are photographed and stored on rolls of microfilm and the rolls are stored in small boxes. Large numbers of the microfilm boxes are stored in various types of cabinets known in the art. Other objects specifically contemplated for use with the invention are data tape cartridges.

Because repeated easy access by a person to the rolls of microfilm is commonly necessary, one type of known cabinet which represents pertinent prior art to the subject invention is a multisided open faced cabinet pivotally mounted on a base member. Each open side of such a cabinet has a plurality of shelves or shelf projections enabling a person to easily insert and remove individual ones of a large number of microfilm boxes from the cabinet. Such rotatable cabinets are also known in sizes that may be conveniently placed upon a table adjacent a person's work station or in multiple vertically stacked units that may be conveniently placed upon the floor adjacent a person's work station for easy repeated use of various ones of the microfilm rolls in the person's work program.

SUMMARY OF THE INVENTION

In the present day use of such cabinets in many offices or other business establishments a problem of security has arisen. Oftentimes information recorded on some or all of the microfilm rolls is sensitive or confidential and it is desirable to provide means to conveniently selectively lock some or all of the rolls against open access.

It is the primary object of the present invention to provide multisided open-faced small object holding cabinets with simple economical means for conveniently selectively locking any one or more of the open-faced sides against access thereto.

It is a further object to provide additional means permitting any one or more of the open-faced sides of such cabinets in a vertically stacked arrangement to be locked against access thereto.

The objects of the invention are achieved by novel constructions in which each of the open-faced sides of the cabinet are pivotally mounted boxes on a base structure, and the boxes are arranged to be engageable along their vertical sides with each other and engageable with a lock mechanism so that selectively the cabinet can be arranged with all of the open-faced sides locked in an exposed condition, or with some of the open-faced sides locked in a closed access condition, or with all of the open-faced sides locked against access thereto.

In a preferred embodiment, the cabinet has four individually pivotable boxes which are open on one face and a movable cover that includes a key operated lock. The cover can be locked over the boxes with any or all of the boxes arranged with the open faces thereof facing outwardly or inwardly of the cabinet.

Other objects and features of the invention will be apparent upon perusal of the hereinafter following detailed description read in conjunction with the drawings.

DESCRIPTION OF THE DRAWINGS

FIG. 1 is an isometric view of a preferred embodiment of the invention;

FIG. 2 is a view similar to FIG. 1 but showing the open-faced sides of two of the boxes exposed for access to the microfilm boxes stored therein;

FIG. 3 is an isometric view of another embodiment of the invention;

DETAILED DESCRIPTION OF THE INVENTION

Figure 4:
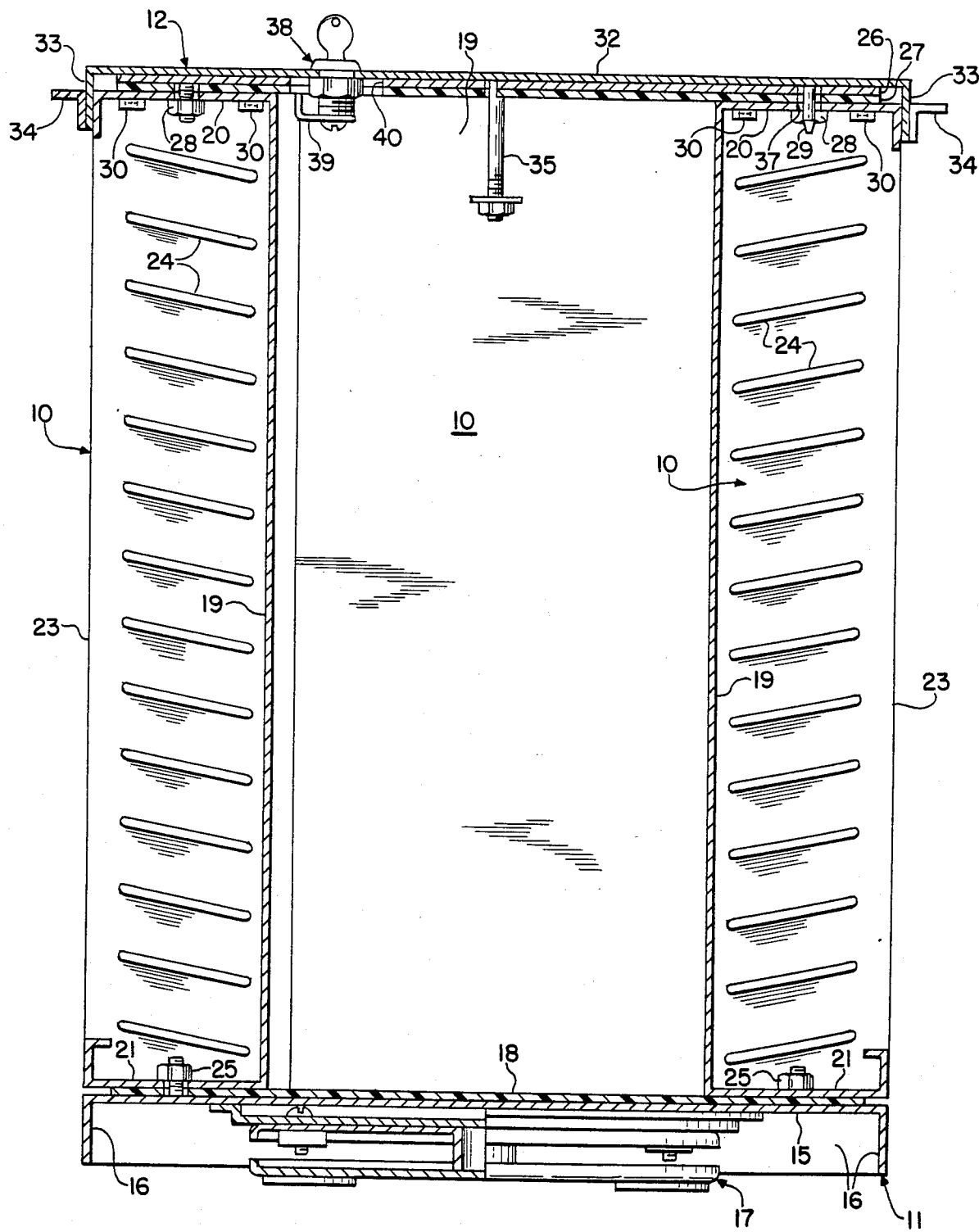
FIG. 4 is an enlarged cross sectional view taken along the lines 4—4 of FIG. 5.

In a preferred embodiment of the invention 4 boxes 10 are rotatably secured to a base assembly 11, and cooperate with a cover assembly 12. In FIG. 1 the three boxes 10 that can be seen are shown with their open-faced sides facing inwardly of the cabinet arrangement. In FIG. 2, two of the boxes 10 are shown with their open-faced sides exposed for access to the contents thereof.

Although a preferred embodiment of the boxes 10 is for the storage of microfilm boxes, those skilled in this art will appreciate that the invention can be used for the secure storage of other relatively small objects.

A number of microfilm boxes 13 are shown in FIG. 2. Those boxes 13 are generally rectilinear paperboard boxes or plastic cartridges containing a roll of microfilm.

In use, the cabinet as described is generally placed upon a table or desk adjacent a person's work station. The person can easily rotate the cabinet and remove and replace various selected ones of said boxes 13 during the course of working with the rolls of microfilm. FIG. 3 shows an embodiment of the invention intended to be used by placement upon the floor adjacent a person's work area. In the embodiment of FIG. 3 two groups of four boxes 10 are secured together in a vertically stacked arrangement upon a base 14. The stacked cabinets are rotatable upon the base 14, and the contents of the boxes 10 are readily available to a person seated or standing.

In all of the embodiments of the invention, any one or more of the boxes 10 can be rotated relative to the base 11 or 14 so that the open face or faces thereof are facing inwardly toward the center of the cabinet. The drawings show two constructions which provide means for locking any one or more of the boxes 10 facing inwardly or outwardly. Although the two locking constructions shown involve the upper end of the cabinet, those skilled in the art will understand that modified forms may alternatively be used between the base and lower ends the boxes 10. As FIG. 1 shows, the microfilm boxes 13 in the boxes 10 which are facing inwardly are secured against removal.

The enlarged off-set cross sectional view of FIG. 4 shows the construction details of one preferred embodiment. The base 11 comprises a substantially square plate 15 with depending side walls 16. A swivel mechanism 17 is secured to the underside of the plate 15. The swivel mechanism 17 can be of any suitable construction known in the art for rotatively mounting cabinets.

The upper side of the plate 15 is provided with a plastics material sheet 18. The function of the sheet 18 is to permit the boxes 10 to be substantially supported on the base 11 in a stable condition and to be quietly rotated thereon.

Each box 10 is generally rectangular in shape with a closed rear wall 19, an upper wall 20, a bottom wall 21, and two vertical side walls 22 as may be seen in FIGS. 1, 2 and 4. Each box 10 is further provided with two intermediate side walls 23. Each side of the intermediate side walls 23 and the inner surfaces of the side walls 22 are provided with vertically-spaced-apart downwardly and rearwardly inclined ribs 24. Each horizontally opposed pair of ribs 24 will support a microfilm box 13.

In the embodiment of FIGS. 1, 2 and 4, each box 10 is rotatively mounted on the plastic sheet 18 by a fastener 25 extending upwardly from the plate 15 of the base 11, through the plastic sheet 18 and through the center of the bottom wall 21 of each box 10 as shown in the cross sectional view of two of the boxes 10 in FIG. 4. Although the fasteners 25 are through the center of each bottom wall, they are offset from the longitudinal center of each side of the plate 15 so that the boxes 10 can be rotated and aligned relative to each other as shown in the drawings and as is described in detail hereinafter.

Figure 5:
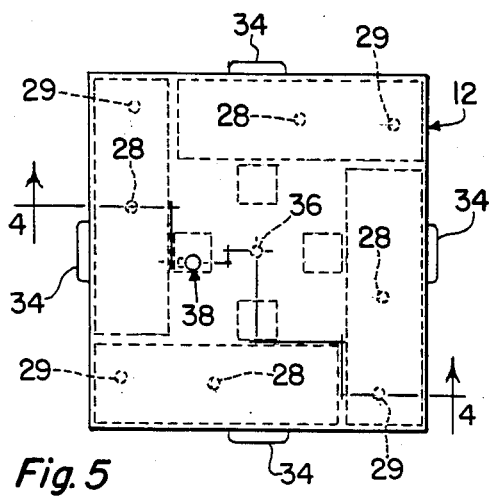
FIG. 5 is a top plan view of the structure shown in FIG. 1.
Figure 6:
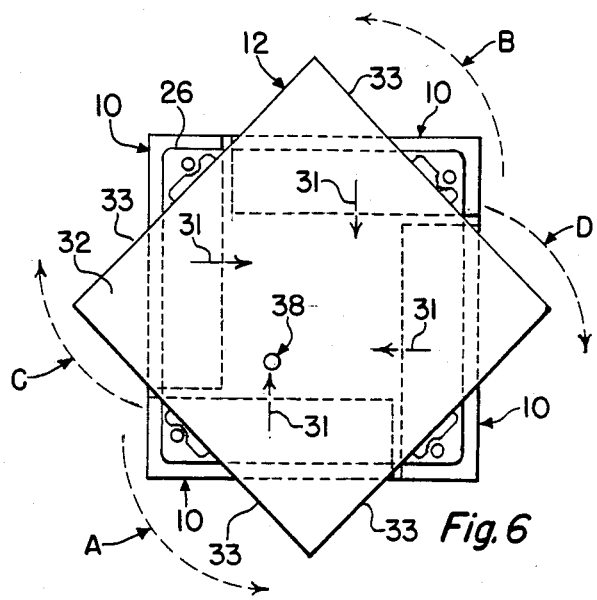
FIGS. 6, 7 and 8 are top plan views showing how the boxes are rotated for open and closed access to the microfilm boxes stored therein.
Figure 7:
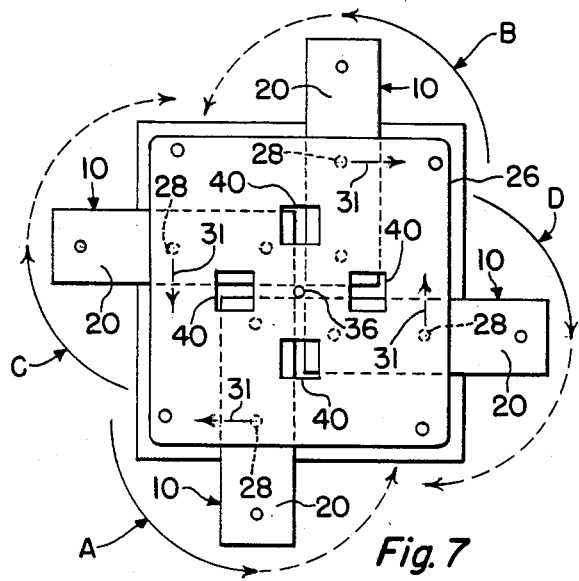
Figure 8:
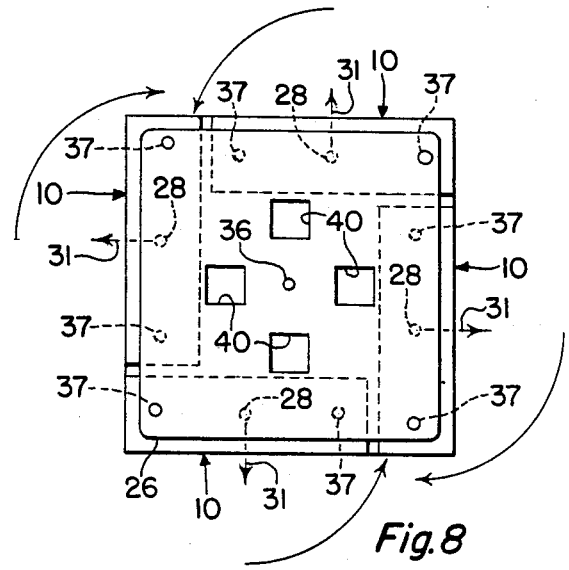

The subject embodiment further includes a flat plate 26 which is shown in a cross sectional edge view in the upper portion of FIG. 4 and in top plan view in FIGS. 6-8. The plate 26 is disposed on the upper walls of the boxes 10 with a plastics sheet material 27 disposed therebetween. The plastic sheet 27 has a function similar to that of the sheet 18 to provide for quiet rotation of the boxes 10 relative to the plate 26. The plate 26 is secured to each of the boxes 10 by a fastener 28 as may be seen in FIGS. 4, 5, 7 and 8. It should be noted that in the showing of the box 10 at the right side of FIG. 4, and because of the placement of the line 4—4 on FIG. 5, the fastener 28 is behind a depending bullet shaped pin 29 to be described. Each of the fasteners 28 depends from the plate 26, through the plastic sheet 27 and through the top wall 20 of the box 10 on the same vertical axis as that of the fastener 25 therebelow. The fasteners 28 permit rotation of each box 10 relative to the plate 26 about the noted vertical axes.

Before describing two different locking embodiments, reference is made to FIGS. 3 and 4 relative to the assembly of the embodiment of a stacked arrangement. The underside of the upper wall 20 of each box 10 is provided with four nuts 30 welded adjacent the four corners thereof as shown in FIG. 4. On the same vertical axes as those of the nuts 30, the bottom wall 21 of each box 10 is provided with four holes (not shown). In making the assembly of FIG. 3, an arrangement such as shown in FIGS. 1, 2 and 4 but absent the cover 12, the plate 26 and the plastic sheet 27 is provided on a relatively heavy base 14. By any suitable known means the lower swivel element of the swivel assembly 17 is secured to the base 14. Four boxes 10 identical to the provided boxes 10 are then disposed on top of the provided boxes 10, and suitable fasteners are applied through the four holes in the bottom walls 21 of the upper boxes 10 and into the nuts 30 of the lower boxes 10. Each vertical stack of two boxes 10 will then be rotatable about the same vertical axis. The upper walls 20 of the upper boxes 10 are then provided with a plate 26 and plastic sheet 27 secured thereto as described above relative to the first embodiment.

The pivoting procedures of the described embodiments can be easily understood from a study of FIGS. 6-8. In FIG. 6 the cover assembly 12 is disposed within its lower side edges resting on the upper surface of plate 26 for reasons which will be described hereinafter. For purposes of the pivoting procedure for the boxes 10 the cover assembly can be disregarded, and that cover assembly is not shown in FIGS. 7 and 8. Starting with a cabinet condition in which the open faces of all of the boxes 10 are disposed inwardly that condition is shown in FIG. 6 by the arrows indicated at 31 and all being directed inwardly. Firstly, the box 10, the outer end of which will follow the dotted line A, is rotated through an angle of approximately ninety degrees in the direction of the arrow of dotted line A. Secondly, either thereafter or simultaneously with the described box rotation along dotted line A, the box 10 which will follow the dotted line B is rotated approximately ninety degrees. The other two boxes 10 are then pivoted in the direction of the arrows of dotted lines C and D through angles of approximately ninety degrees. That pivoting movement is shown as accomplished in FIG. 7. The dotted lines A, B, C and D are now shown solid in FIG. 7. Note the disposition of the open faces of the boxes 10 indicated by the arrows 31 in FIG. 7. To proceed from the box positions of FIG. 7 to that of FIG. 8 wherein the arrows 31 indicate the open faces of the boxes 10 as directed outwardly, the boxes which were firstly and secondly pivoted along lines A and B are then pivoted along the lines shown to face outwardly. The boxes 10 which were pivoted along the lines C and D are then pivoted to complete the pivoting procedure.

By following the described procedure in reverse, the boxes 10 may be all aligned with their open sides facing inwardly.

Also, by following the described procedure of first moving one opposite pair of boxes 10 through angles of ninety degrees, followed by then pivoting the other pair ninety degrees, followed by then again pivoting the first pair, followed by then again pivoting the other pair, in may be seen that selected ones of said boxes may be faced inwardly while others may be faced outwardly.

In reference to the embodiment of FIG. 3, each vertical stack of two boxes 10 is pivoted together in the pivoting procedure described.

The drawings show two embodiments of locking assemblies for locking the boxes 10 in any rotated positions. Those skilled in the art will understand upon a study of the two locking assemblies that alternatively to using both assemblies, either assembly can be used singly.

In the first locking assembly the cover assembly 12 comprises a top plate 32 with four integral depending side walls 33. For convenience in raising, lowering and rotating the cover assembly 12, the side walls 33 are provided with extending handles 34. To properly easily position the cover assembly 12 over the plate 26 and the upper ends of the boxes 10, the underside of the top plate 32 at the center thereof is provided with a depending stud 35 which may be seen in FIG. 4. The lower end of the stud 35 may be provided with a threaded bolt and washer to limit upward movement of the cover assembly 12. The stud 35 extends through a hole 36, shown in FIGS. 7 and 8, through the center of the plate 26. The stud 35 also extend through a hole in the plastic sheet 27. The square defined by the inner surfaces of the depending side walls 33 of the cover assembly 12 is slightly larger than the square defined by drawing a line about the periphery of the four boxes 10 when positioned as shown in FIG. 8. Thus, when the cover assembly 12 is disposed over the upper end of the boxes 10 as shown in FIGS. 1-5, the side walls 33 prevent rotation of any box 10 from that rotated position.

The second locking assembly comprises four depending bullet shaped pins such as pin 29 shown in FIG. 4. Each pin 29 is secured to the underside of the top plate 32 of the cover assembly 12 adjacent the four corners thereof. The dotted lines indicated at 29 in FIG. 5 are intended to represent those pins 29. As may be seen in FIG. 4, each pin 29 extends through holes in the plate 26, the plastic sheet 27, and the top wall 20 of one of the boxes 10. The top wall 20 of each box 10 is provided with two holes capable of receiving the pin 29. The positions of those two holes are indicated at 37 in FIG. 8 and enable each box 10 to be locked facing either inwardly or outwardly. Thus, when the cover assembly 12 is disposed over the upper end of the boxes 10 as shown in FIGS. 1-5, the pins 29 prevent rotation of any box 10 from its rotated position. The pins 29 serve the additional function of securely holding the boxes 10 in a rotated position. The bullet shaped tip of each pin 29 aids in the proper manual alignment of the boxes 10 relative to the base 11 and the cover assembly 12.

Figure 9:
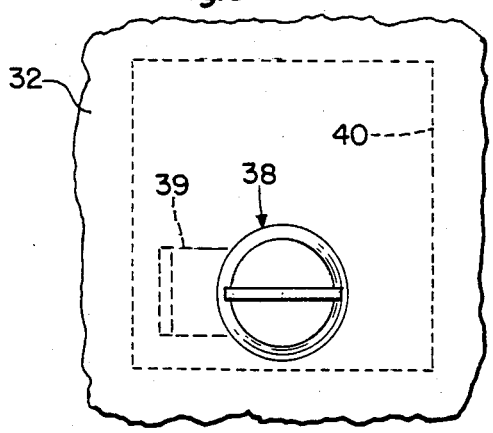
FIGS. 9 and 10 are enlarged fragmentary views of the cover showing the key-operated lock for the cabinet.
Figure 10:
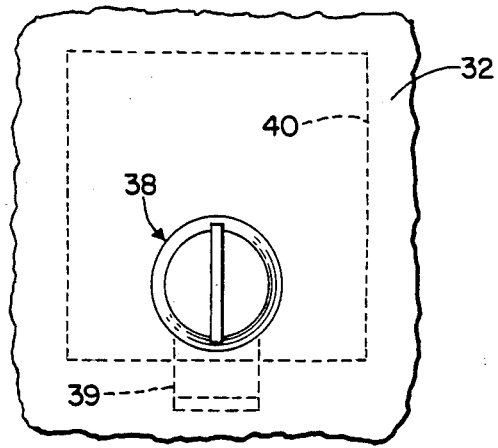

The preferred embodiments further include a key lock assembly 38. The key lock assembly 38 comprises any suitable known form of lock with a locking finger 39 such as shown in FIGS. 4, 9 and 10 that can be locked with a removable key in either of two rotated positions ninety degrees apart. The plate 26 is provided with four holes 40 such as shown in FIGS. 4, and 7-10. The holes 40 are shaped and positioned in the plate 26 relative to the position of the key lock assembly 38 in the top plate 32 of the cover assembly 12 so the locking finger may be selectively positioned and locked either within a hole 40 as shown in FIG. 9 or beneath the plate 26 as shown in FIG. 10, in any rotated position of the cover assembly 12 relative to the plate 26. When the key lock assembly 38 is aligned as shown in FIG. 10, the cover assembly 12 can not be raised and thus the side walls 33 and the pins 29 prevent any rotation of a box 10 from an inwardly directed condition to an outwardly directed condition. From the foregoing detailed description it is apparent that with a box 10 in an inwardly directed condition open access to the contents of the box is absent. When the key lock assembly is aligned as shown in FIG. 9, the cover assembly 12 may be raised to the extent permitted by stud 35 by grasping opposed handles 34 and raising the cover assembly. The cover assembly 12 may then be rotated from the position of FIG. 5 to that of FIG. 6, and the cover assembly may then be lowered to rest upon the plate 26. The boxes 10 may then be repositioned selectively either facing inwardly or outwardly, or in any combination thereof by the rotating procedure previously described, and the cover assembly 12 may then be returned to the position of FIG. 5 to hold or lock the boxes 10 in the repositioned conditions.

Having described the invention it is understood that changes can be made in the described embodiments by one skilled in the art within the spirit and scope of the claims.

What is claimed is:

1. An access and security arrangement for a plurality of objects, said arrangement comprising a plurality of open-faced boxes, each of said open-faced boxes having a back wall with side walls, a top wall and a bottom wall extending at right angles from the periphery of said back wall to an open face,
   means on the walls of said boxes for supporting said objects in said boxes with said objects accessible at the open faces of said open-faced boxes,
   a base member,
   support means pivotally carrying each of said boxes for pivotal movement about a vertical axis on said base member with said open face thereof in a substantially vertical plane,
   said support means further comprising pivot means at the center of the bottom wall of each of said boxes and on said base member for mounting each of said boxes to be pivotable about said vertical axis on said base member with said vertical axis positioned substantially at the center of the bottom wall of each box, said pivot means of each of said boxes arranged in a spaced apart relationship to each other on said base member to permit all of said boxes to be pivoted to a first position with said open faces of each of said boxes covered by said other boxes and to permit any selected number of said boxes to be pivoted to second positions with said open faces exposed for access to said objects, and
   manually operable locking means for engaging and securing said boxes to prevent pivotal movement on said base member in any selected arrangement of said first and second positions.

2. A cabinet for storing a plurality of cassette-like objects, said cabinet comprising a plurality of rectilinearly shaped boxes, each of said boxes having one open face and closed side, top, bottom and rear walls, shelf means in each of said boxes for supporting said plurality of cassette-like objects, a base member having an upper substantially flat surface enclosed by a circumferential periphery, pivot means mounted substantially at the center of the bottom wall of each of said boxes for pivotally mounting said boxes upright on the upper surface of said base member and adjacent to the circumferential periphery of said base member for rotation about fixed vertical axes on said base member in a spaced arrangement permitting rotation of any one of said boxes with said open face thereof facing selectively inwardly or outwardly radially of said vertical axes and relative to the circumferential periphery of said base member independently of the inward or outward facing of any of said open faces of the other boxes, said pivot means further carried on the upper surface of said base member to provide substantially closed surfaces of said boxes circumferentially about all of said boxes to prevent access to the open face of any box facing inwardly, a cover member movably carried on the top walls of said boxes for movement to first and second positions, means on said cover member for maintaining said boxes fixed against rotation from any selected position with said open faces thereof facing inwardly or outwardly when said cover member is in said first position and for enabling said boxes to be rotated when said cover member is in said second position.

3. In a cabinet as defined in claim 2, and a key-operated lock mounted in said cover member and comprising a key controlled locking finger, and plate means secured to the top walls of said boxes and engageable by said locking finger when said cover member is in said first position for locking said cover against movement from said first position to said second position.

4. In a cabinet as defined in claim 2, and said means on said cover member for maintaining said boxes fixed against rotation comprising said cover member including a top wall and side walls depending from the periphery of said top wall, and said top wall and side walls of said cover member being shaped to closely superpose said top walls and the circumferential periphery of the upper marginal portions of the outwardly facing of said rear walls or open faces of said boxes when said cover member is in said first position.

5. In a cabinet as defined in claim 2, and said means on said cover member for maintaining said boxes fixed against rotation comprising said cover member including a top wall and a plurality of pins mounted on the underside of said top wall and depending therefrom, the lower end of each pin being bullet-shaped, a plurality of holes in the top walls of said boxes and spaced radially from said fixed vertical axes thereof, said pins being positioned on said top wall of said cover member and said holes being positioned on said top walls of said boxes so that one of said pins is positioned in one of said holes of each of said boxes when said cover member is in said first position.

6. A cabinet for storing a plurality of cassette-like objects, said cabinet comprising four substantially identical rectilinearly shaped boxes, each of said boxes having one open face and closed side, top, bottom and rear walls, shelf means in each of said boxes for supporting said plurality of cassette-like objects for insertion and removal from said boxes only through the open face thereof, a base member comprising a base plate the periphery of which is shaped substantially as a square and said base plate being swivel-mounted on a base element, pivot means mounted substantially at the center of the bottom wall of each of said boxes for pivotally mounting each of said boxes in an upright condition on said base plate for rotation about a fixed vertical axis substantially at the center of the bottom wall thereof, said pivot means further carrying each of said boxes positioned adjacent one marginal edge of said base plate and offset from the longitudinal center thereof a distance greater than the depth dimension of said boxes, said boxes having a width such that when said boxes are rotatively aligned with the rear walls or in the alternative the open faced sides thereof substantially coplanar to the adjacent marginal edge of said base plate the peripheral circumferential surface of said boxes is a substantially closed surface from the area above said base plate and inwardly of said boxes, and means for securing said boxes against rotation relative to said base plate when said boxes are rotatively aligned in any selected combination of the rear walls or the open faced thereof substantially coplanar to the adjacent marginal edge of said base plate.

7. In a cabinet as defined in claim 6, said last mentioned means comprising a cover assembly secured over the top walls of said boxes, and said cover assembly including means for engaging the upper end portions of said boxes to prevent rotation relative to said base plate.

8. In a cabinet as defined in claim 7, wherein said means for engaging the upper end portions of said boxes comprises a substantially square cover plate having depending side walls, said cover plate having a size providing for close peripheral encirclement of said upper end portions of said boxes by said depending side walls when said boxes are rotatively aligned in any selected combination of the rear walls or the open faced sides thereof coplanar to the adjacent marginal edge of said base plate.

9. In a cabinet as defined in claim 8, wherein said means for engaging the upper end portions of said boxes includes a key-operated lock for locking said cover plate against removal from the upper end portions of said boxes when said boxes are rotatively aligned in any seleted combination of the rear walls or the open faced sides thereof substantially coplanar to the adjacent marginal edge of said base plate.

10. In a cabinet as defined in claim 7, wherein said means for engaging the upper end portions of said boxes comprises a cover plate having a plurality of depending pins on the underside thereof, each of said pins having a bullet-shaped lower end, the top walls of said boxes having a plurality of holes therethrough spaced radially from said fixed vertical axes for rotation of said boxes, said pins being positioned on said cover plate so that one of said pins is inserted through one of said holes to prevent rotation of said boxes relative to said base plate when said boxes are rotatively aligned in any selected combination of the rear walls or the open faced sides thereof substantially coplanar to the adjacent marginal edge of said base plate.

11. In a cabinet as defined in claim 9, wherein said means for engaging the upper end portions of said boxes includes a key-operated lock for locking said cover plate against removal from the upper end portions of said boxes when said boxes are rotatively aligned in any selected combination of the rear walls or the open faced sides thereof substantially coplanar to the adjacent marginal edge of said base plate.

* * * * *